Dec. 19, 1944.  E. L. HELWIG  2,365,637
METHOD OF SHAPING THERMOPLASTIC DOMES
Filed Aug. 28, 1942

WITNESS:
Robt R. Mitchel

INVENTOR
Edward L. Helwig
BY John F. Birgin
ATTORNEY.

Patented Dec. 19, 1944

2,365,637

UNITED STATES PATENT OFFICE 2,365,637

METHOD OF SHAPING THERMOPLASTIC DOMES

Edward L. Helwig, Bristol, Pa., assignor to Röhm & Haas Company, Philadelphia, Pa., a corporation of Delaware Application August 28, 1942, Serial No. 456,510

6 Claims. (Cl. 18—56)

This invention relates to a method and apparatus for shaping rigid synthetic, organic, thermoplastic sheet material into objects having three-dimensional curved surfaces and which may be classified as "domes." The term "dome" or "domes" as used herein includes three-dimensional curved objects which are of concave or convex shape and which may have a variety of forms. While, in general, innumerable objects of three-dimensional concave or convex shapes are included within the scope of the term "dome" or "domes" I am particularly concerned with such objects as airplane turrets, cockpit enclosures, bomber-noses, curved windows for bombardiers' stations, safety guards, shockproof helmets, instrument and machine housings and containers, etc.

When thermoplastic materials are used to form objects such as those listed above and for other purposes, it is desirable that the surface be highly polished. It is extremely difficult and expensive to produce the necessary high polish on curved sheets of the thermoplastic material after they are shaped. Therefore, it is an object of this invention to form highly polished flat sheets into three-dimensional concave or convex shapes in such a way as to minimize the formation of surface irregularities or defects. United States Patents Nos. 2,123,552 and 2,142,445, issued July 12, 1938, and January 3, 1939, respectively, cover processes for shaping ductile sheets of thermoplastic material. In these processes, fluid pressure is applied to one side of a sheet, thereby forcing the sheet to conform to the shape of the mold. While these processes represent an advance in the art, they are relatively cumbersome and more expensive to operate than the process herein described. The difference in the expense of operation lies chiefly in the difference in cost of the equipment and in the relative speeds of production, the advantage in both cases resting with the present process.

In accordance with the present invention, a sheet of synthetic, organic, thermoplastic material which has been rendered ductile, as, for example, by heating, is clamped along its edge or edges, whereupon there is established a gaseous pressure differential on opposite sides of the sheet until the sheet becomes distended. A form or mold is then inserted into the cavity formed by the distended sheet and in close proximity to the surface thereof. The pressure differential is reduced and adjusted to permit the normal contractive forces of the thermoplastic sheet to enter into and assist in controlling the subsequent contraction which takes place. Thus, the distended sheet is permitted to come into light contact with the form and conform to the shape thereof. Since no external force is required in the last mentioned step, defacement or marring of the surface of the distended sheet in contact with the form is reduced to an absolute minimum, and substantial freedom from internal stresses in the finished object is attained. The shaped sheet is then cooled until it is no longer ductile, whereupon it is removed from the clamping device and out of contact with the form aforesaid.

A better understanding of the process may be had from a consideration of the drawing, attached.

Figure 1:
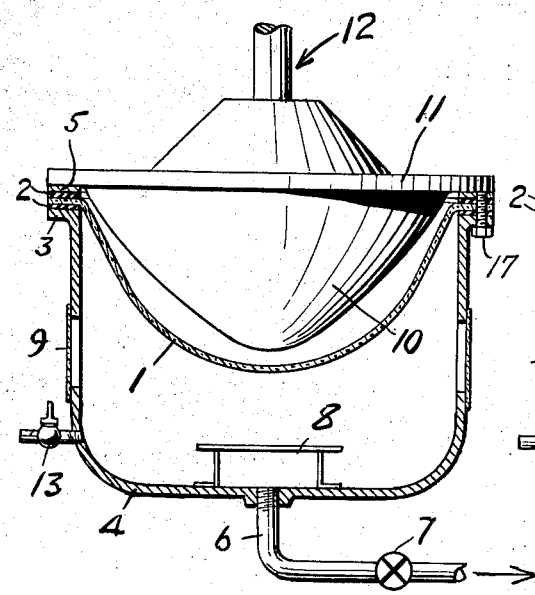
Fig. 1 is a side elevation in section of an assembly suitable for forming a thermoplastic dome by reducing the pressure within the assembly. It shows a sheet of ductile material 1 in a hemispherical shape prior to release of the pressure and shrinking of the sheet back against the mold.
Figure 2:
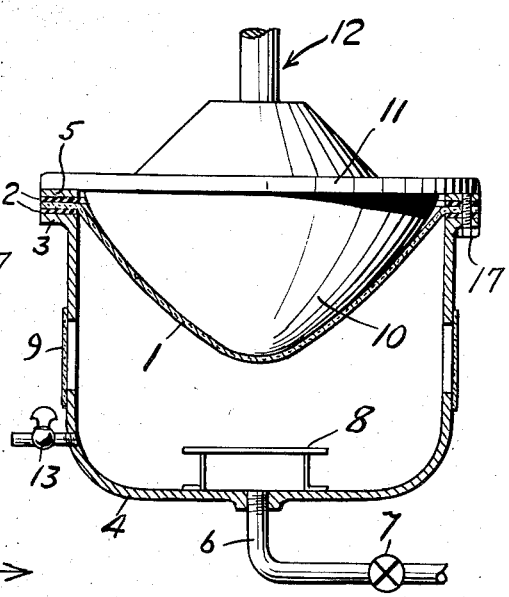
Fig. 2 is a view similar to Fig. 1 but shows the sheet fully conformed to the shape of the mold.

In carrying out the process in apparatus shown in Figs. 1 and 2, a rubber gasket 2 is laid on the rim 3 of the pressure chamber 4, and thereupon is laid a sheet of thermoplastic material 1 which has been heated and is in the ductile condition. A second gasket 2 is applied and then a metal ring 5 is placed thereupon, and the assembly is clamped together by suitable means such as bolts 17. Alternative clamping devices, such as C-clamps or quick-action clamps, may be employed. The use of clamps instead of bolts obviates the need of pre-drilling the thermoplastic sheet to accommodate the bolts. Even when bolts are used, the sheet need not necessarily be drilled if it is of such diameter as to fit within the line of bolts and can be held securely by the rim of the chamber and ring. There is less tendency for the sheet to slip if the rim has a rolled lip. It is to be understood that the ring may alternatively be held in position by a lever device which will eliminate the need of individual clamps or bolts. After the ductile thermoplastic sheet is securely held in position at its edge, the pressure chamber 4 is partially evacuated through pipe 6 and the rate of flow of the gas is regulated by valve 7. In this way, a gaseous pressure differential is set up on opposite sides of the sheet. A deflection plate 8 permits smoother operation. As the pressure is reduced in chamber 4, the thermoplastic sheet is gradually forced by the external atmospheric pressure to assume a curved shape. The operation is continued until the sheet is drawn to the desired extent, as determined by observation through sight-glass 9. When the desired shape has been obtained, the mold 10 is lowered by suitable means 12 to the desired position, for example, until the flange 11 rests on the top of the clamping assembly. The mold is thus inserted into the cavity made by the distended sheet and in close proximity to the sheet as shown in Fig. 1. The pressure differential is reduced by closing valve 7 and admitting air into the chamber 4 through valve 13. When the pressure differential has been reduced sufficiently, the ductile thermoplastic sheet shrinks or contracts and tends to revert to its original form. This contraction causes the sheet to conform to the shape of the mold as shown in Fig. 2, in which shape it is allowed to cool until it becomes rigid and sufficiently hard to resist deformation. The mold can then be raised and the domed sheet removed.

Figure 3:
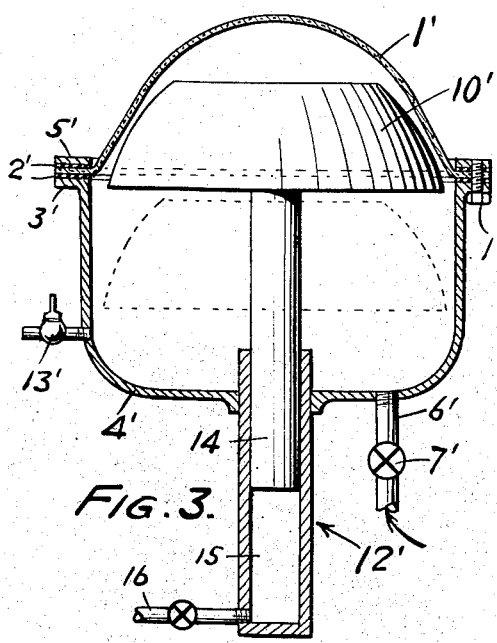
Fig. 3 is a side elevation of an assembly suitable for forming a thermoplastic dome by increasing the pressure within the assembly. It shows the sheet of ductile material 1' in a hemispherical shape prior to the release of pressure in the chamber and the shrinking of the sheet back against the mold 10'.
Figure 4:
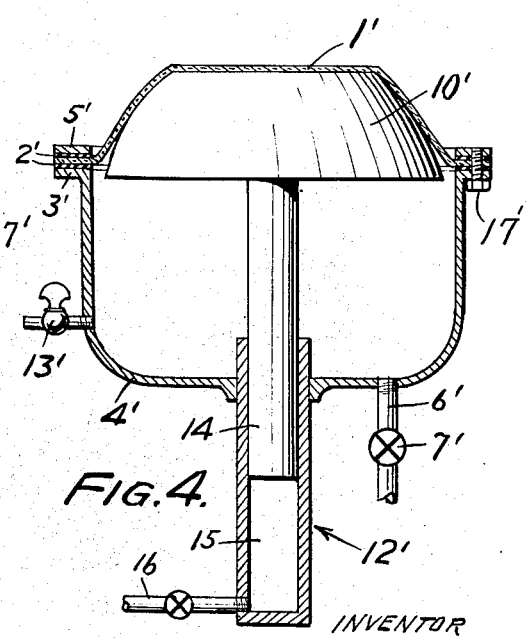
Fig. 4 is a view similar to Fig. 3 but shows the sheet fully conformed to the shape of the mold.

Alternately, in the apparatus shown in Figs. 3 and 4, the domes may be shaped by first blowing the ductile sheet into a domed shape, inserting the mold in the cavity formed by the sheet, reducing the pressure differential and allowing the sheet to contract and shrink back against the mold and harden in this shape. This method is illustrated by reference to Figs. 3 and 4. A sheet of synthetic, organic, thermoplastic material is clamped to the rim of the chamber as detailed above. The gaseous pressure within the chamber 4' is increased, for example, by admitting compressed gas through pipe 6' by regulating valve 7', thereby distending the ductile sheet into a domed shape 1'. The mold 10' is raised into position by means of an elevating device 12' as, for example, by fluid pressure through pipe 16 acting on piston 14 in cylinder 15. When the mold is in position, valve 7' is closed and the internal pressure is relieved by opening valve 13'. Sheet 1' contracts into contact with mold 10' and is maintained in this position until it cools. At this state, the entire assembly is shown in Fig. 4. After the sheet has hardened, it is removed and the mold is lowered.

Many details of the construction of the chamber and mold may be varied without altering the character of the invention. The horizontal cross-section of the pressure chamber may be other than circular. For example, it may be elliptical, triangular, etc. Likewise, the mold may be of varied shape and construction. In general, it is preferred that the cross-section of the base of the mold approximate the size and shape of the cross-section of the pressure chamber at the rim. The mold may be made of wood or metal or any easily formed material. It is preferred that the surface of the mold be so smooth that there is no transfer of surface defects or irregularities to the thermoplastic dome. If metal molds are used, it is desirable that they be plated and/or polished as, for example, by chromium-plating or polishing to a mirror-like surface. If wood is used, it is preferably covered with a material such as felt.

The means for holding the mold in position can also be varied. One method is to bolt it to the rim of the pressure chamber. Another is to hold it in position by a lever arrangement or by means such as shown in Figs. 3 and 4.

In the construction of the pressure chamber, devices may be added to make the operation automatic. For example, instead of determining the final end point of the distending operation by visual observation through the sight-glass, this point can be determined by an "electric eye" or photoelectric cell so arranged that it can actuate the pressure valves. Other pressure release mechanisms or pneumatic valves may be employed, preferably equipped with full range throttling attachments to insure smooth operation.

Although I prefer to work with the polymeric derivatives of acrylic and methacrylic acids, the process is not limited to these materials. Thermoplastic materials in general may be formed by this process into curved objects. A list of such materials includes the following, which may be used in various combinations: polymeric derivatives of acrylic acid and methacrylic acid such as the esters, styrene, acrylamides, chlorinated and otherwise substituted acrylate and methacrylate polymers, plasticized nitrocellulose and combinations including the esters and ethers of cellulose, such as cellulose acetate, cellulose acetobutyrate, ethyl cellulose, benzyl cellulose, methyl cellulose, and vinyl chloride and vinyl acetate, including copolymers of two or more polymerizable materials. The invention is applicable to the shaping of sheets of synthetic, organic, thermoplastic materials which tend to revert to their original shape when they have been rendered ductile and have been distended.

*Example*

A polished sheet of polymethyl methacrylate, one-quarter of an inch in thickness and four feet in diameter, was heated at about 135° C. until it had become soft and ductile. It was then clamped to the rim of a pressure chamber with suitable clamping devices. The chamber was partially evacuated, and the sheet was drawn to a curved shape. When the sheet had been distended sufficiently, a mold was lowered into the cavity and was clamped to the flange of the pressure chamber. Air was allowed to bleed into the chamber until the pressure was essentially equalized. The sheet slowly contracted and conformed to the shape of the mold and was allowed to cool in this position. After about ten minutes, the sheet had cooled to a firm, rigid condition. Thereafter, the dome and mold were removed from the pressure chamber and the dome remained in the shape of the mold.

The flanged portion of the molded sheet may be removed, if desired. During the cooling period, fluids may be applied to the convex side of the dome to hasten cooling.

During the distending operation, some portions of the sheet are subject to greater stretch than others, and this greater stretching causes a greater reduction of thickness of the sheets. In order to produce a dome of more uniform thickness, the original sheet may be made thicker in those portions which later will be subjected to the greater stretch.

Various modifications of the procedure set forth will be apparent to those skilled in the art. Such modifications as come within the scope of the appended claims are likewise within the scope of this invention.

I claim:

1. A process for the production of rigid domes from organic, synthetic, thermoplastic material in rigid sheet form which comprises rendering said rigid sheet ductile by heating, holding the edges of the ductile sheet in a clamping device, establishing a gaseous pressure differential on opposite sides of the sheet until the ductile sheet is distended, inserting a form into the cavity formed by said ductile and distended sheet, reducing the pressure differential so as to allow the ductile and distended sheet to contract by its own normal contractive forces and come into light contact with the form and conform to the shape thereof, cooling said sheet until it is rigid, and thereafter removing the rigid dome from contact with the form.

2. A process for the production of rigid domes from synthetic, organic, thermoplastic material in rigid sheet form which comprises rendering said rigid sheet ductile by heating, holding the edges of the ductile sheet in a clamping device, applying suction to one side of the sheet until the ductile sheet is distended, inserting a form into the cavity formed by said ductile and distended sheet, reducing the pressure differential so as to allow the ductile and distended sheet to contract by its own normal contractive forces and come into light contact wtih the form and conform to the shape thereof, cooling said sheet until it is ragid, and thereafter removing the rigid dome from contact with the form.

3. A process for the production of rigid domes from synthetic, organic, thermoplastic material in rigid sheet form which comprises rendering said rigid sheet ductile by heating, holding the edges of the ductile sheet in a clamping device, applying greater than atmospheric pressure to one side of the sheet until the ductile sheet is distended, inserting a form into the cavity formed by said ductile and distended sheet, reducing the pressure differential so as to allow the ductile and distended sheet to contract by its own normal contractive forces and come into light contact with the form and conform to the shape thereof, cooling said sheet until it is rigid, and thereafter removing the rigid dome from contact with the form.

4. The process of claim 1 in which the synthetic, organic, thermoplastic material comprises polymeric esters of acrylic and methacrylic acids.

5. The process of claim 1 in which the synthetic, organic, thermoplastic material comprises a copolymer of ethyl acrylate and methyl methacrylate.

6. The process of claim 1 in which the synthetic, organic, thermoplastic material in polymeric styrene.

EDWARD L. HELWIG.